(No Model.)
W. K. STANSBURY.
PRUNING SAW.
No. 296,241. Patented Apr. 1, 1884.
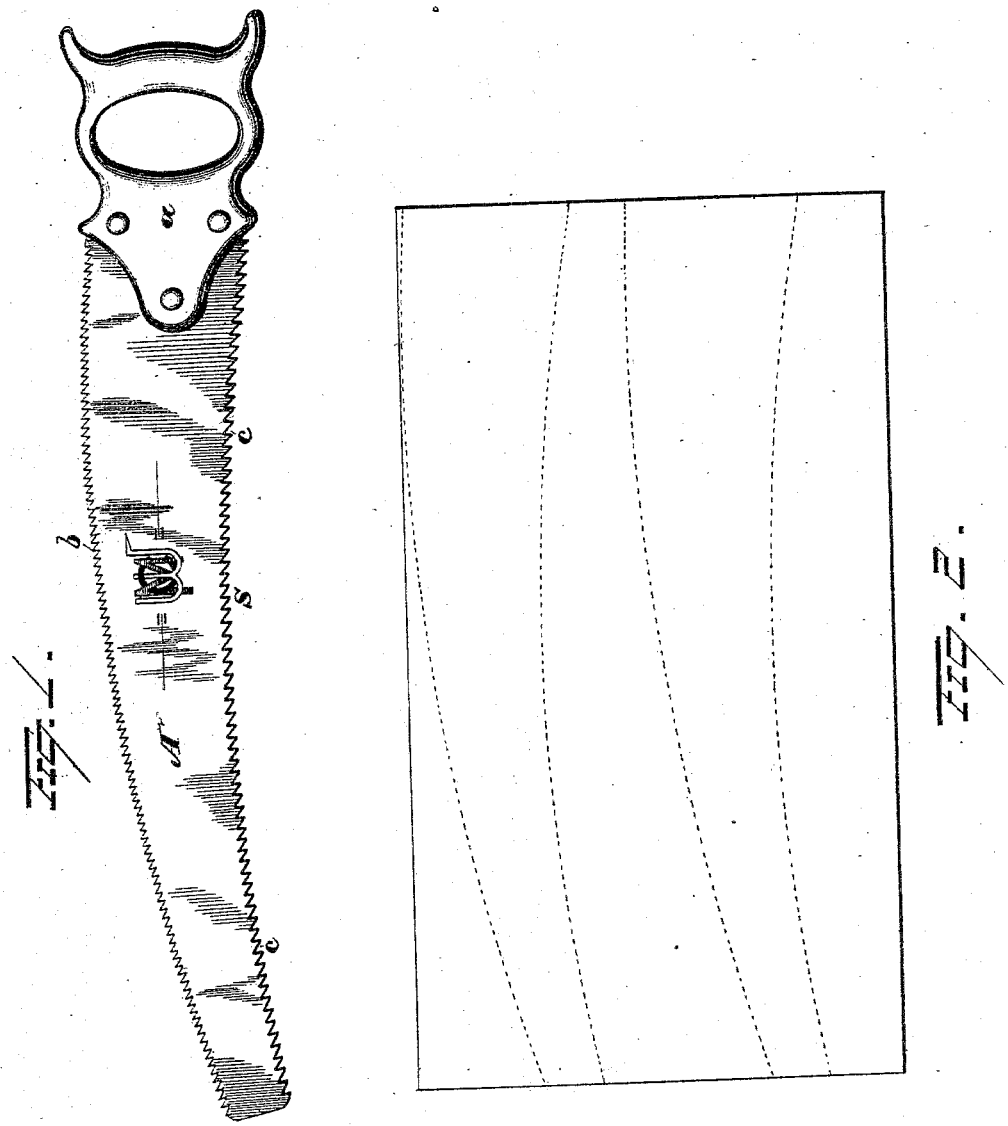

UNITED STATES PATENT OFFICE.

WILLIAM K. STANSBURY, OF MIDDLETOWN, NEW YORK.

PRUNING-SAW.

SPECIFICATION forming part of Letters Patent No. 296,241, dated April 1, 1884.

Application filed February 9, 1884. (No model.)

*To all whom it may concern:*

Be it known that I, WILLIAM K. STANSBURY, of Middletown, in the county of Orange and State of New York, have invented certain new and useful Improvements in Pruning-Saws; and I do hereby declare the following to be a full, clear, and exact description of the invention, such as will enable others skilled in the art to which it appertains to make and use the same.

My invention relates to an improvement in pruning-saws, the object being to provide a thrust and draw cut saw combined in a single implement for pruning or other convenient purposes, a further object being to provide a combined thrust and draw cut saw of such form that a series of saw-plates can be cut from a sheet of metal without waste of material.

With these ends in view my invention consists in a pruning-saw provided with a convex line of teeth constructed to cut when the saw is thrust from the operator, and with a concave line of teeth constructed to cut when the saw is drawn toward the operator.

My invention further consists in a saw provided with a convex and concave line of teeth, in which the convex and concave lines have the same curve.

My invention further consists in certain features of construction and combinations of parts, as will be fully described, and pointed out in the claims.

In the accompanying drawings, Figure 1 is a view of the saw; and Fig. 2 is a view of a sheet of metal, showing by dotted lines the saw-plates to be cut therefrom.

A represents a saw-plate of suitable metal, provided with a handle, *a*, attached thereto in any approved manner. One edge of the plate A is convex and provided with a line of teeth, *b*, set raking toward the small end of the saw, and thereby adapted to cut when the saw is thrust from the operator. The other edge of the plate S is concave and provided with a line of teeth, *c*, set raking toward the handle end of the saw, and thereby adapted to cut when the saw is drawn toward the operator. Furthermore, the curve of the convex line of teeth is the same as the curve of the concave line of teeth. For this reason the saw-plates can be cut from a sheet of metal by cutting each successive plate with ends reversed, as shown in Fig. 2, with the least possible waste of material.

The size and rake of the teeth, in either the convex or concave lines is a matter of choice, different styles being furnished to suit the different requirements. The length, breadth, and thickness of the saw-plates may also be varied as occasion requires, a convenient length for general purposes being eighteen inches with a breadth decreasing from three inches at the handles to about one inch at the opposite end.

I do not wish to be understood as limiting myself to the exact convex and concave curve represented in the drawings, but reserve the privilege of constructing the saw with any curve which experience may dictate; nor do I wish in other respects to limit myself to the exact construction represented, but reserve the privilege of making such changes as fairly fall within the spirit and scope of my invention.

Having fully described my invention, what I claim as new, and desire to secure by Letters Patent, is—

1. A pruning-saw provided with a convex line of teeth constructed to cut when the saw is thrust, and with a concave line of teeth constructed to cut when the saw is drawn, substantially as set forth.

2. A pruning-saw provided with a convex line of teeth and with a concave line of teeth, the convex and concave lines having a uniform curve, substantially as set forth.

3. As a new article of manufacture, a saw provided with a convex line of teeth constructed to cut when the saw is thrust, and with a concave line of teeth constructed to cut when the saw is drawn, the convex and concave lines having the same curve, substantially as set forth.

4. A pruning-saw having a curved row of teeth on one edge and a curved row of teeth on its opposite edge, substantially as set forth.

In testimony whereof I have signed this specification in the presence of two subscribing witnesses.

WILLIAM K. STANSBURY.

Witnesses:
WM. MILLSPAUGH,
C. I. HUMPHREY.